Patented Jan. 30, 1923.

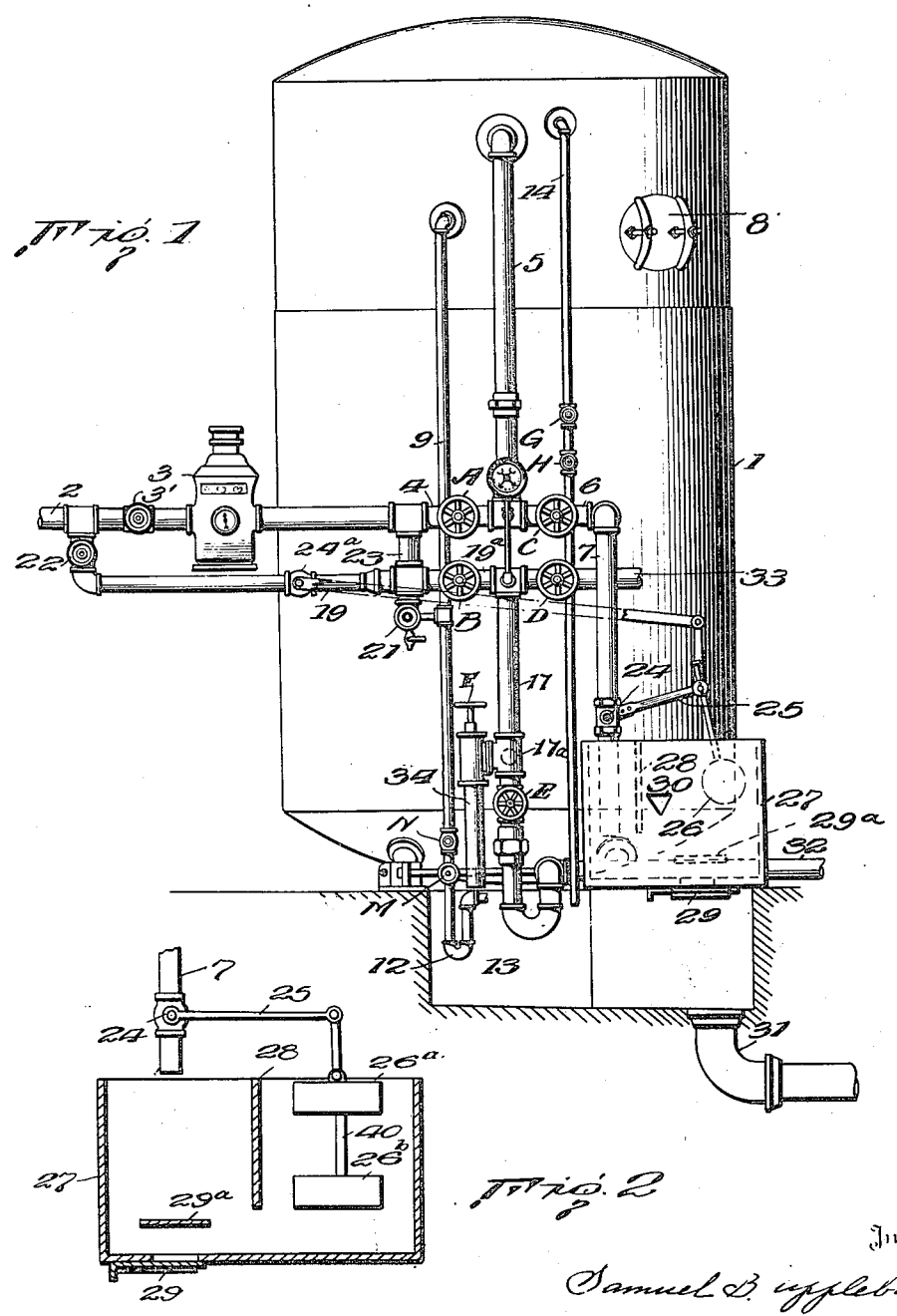

1,443,892

UNITED STATES PATENT OFFICE.

SAMUEL B. APPLEBAUM, OF NEW ROCHELLE, NEW YORK, ASSIGNOR TO THE PERMUTIT COMPANY, OF NEW YORK, N. Y., A CORPORATION OF DELAWARE.

WATER-SOFTENING APPARATUS.

Application filed July 21, 1920. Serial No. 397,832.

*To all whom it may concern:*

Be it known that I, SAMUEL B. APPLE-BAUM, a citizen of the United States, residing at New Rochelle, in the county of Westchester and State of New York, have invented certain new and useful Improvements in Water-Softening Apparatus, of which the following is a specification.

This invention relates to water softening apparatus; and it comprises a water softening apparatus of the zeolithic type provided with the usual connections for introducing hard water, withdrawing soft water, introducing salt solution and withdrawing the same, a connection adapted to supply hard water to the apparatus for backwashing purposes and a special outlet for backwash water, said outlet carrying a float valve regulating the outflow of water therefrom; all as more fully hereinafter set forth and as claimed.

In the normal operation of the well known zeolitic type of water softening apparatus, hard water flows through a bed of zeolites for a time, becoming softened thereby. Afterwards, the zeolitic bed is regenerated by flowing salt solution therethrough, the salt solution is rinsed out with water, etc. The zeolites are customarily used in the form of a bed of granular material. In the best mode of operation, the hard water to be softened is sent downwardly through the bed, as in doing so a number of advantages are gained; among them being the greater uniformity of flow with, therefore, a better utilization of the activity of the bed, avoidance of channeling, etc. It is usual to "backwash", at least occasionally, between the softening operation and the regenerating operation; backwashing consisting in sending a temporary strong flow of water through the bed in the opposite direction to that taken by the water in softening. There are several reasons for this, one being to detach and carry away any mechanical impurities, mud, etc., brought in by the water and deposited in or on the granules; and another being to rearrange the granules of the bed. With downward softening the greatest uniformity of water passage throughout the whole cross-section of the bed is secured where the finer material is at the top and the coarser below. On sending in a strong upward flow of water the bed is, more or less, lifted and disturbed and the finer material settles out last. In backwashing, the force of the flow should be enough to move the zeolite granules and to detach and carry away solid foreign matters from the face of the bed. Nearly all waters contain more or less suspended solid matter, bacteria, slime, mud, etc., and it is necessary to remove this material as it accumulates; and particularly since the finer particles tend to accumulate in and on the granules and to cement them together to the detriment of the desired uniformity of flow. In so doing, however, the flow of the water must be quite accurately controlled; it must be fast enough to detach and remove dirt but not fast enough to carry away zeolite granules. In the art, it is customary to use a meter to control the flow of water to be softened through the bed; and it is often the practice to use a second meter to control the flow of backwash water, since a meter adapted to control the comparatively gentle flow of water in softening is not adapted for the more violent flow of backwash water. The use of two different meters, however, introduces a complication in operation and the chance of a source of error. Naturally, any flow meter must be used in connection with a clock or watch and the opportunities for error are manifest. It is an object of the present invention to provide automatic flow control.

In the present invention, I have devised a simple arrangement to this end, obviating the necessity for a second meter and timing in controlling the backwash flow. In so doing, a bypass is arranged around the meter which controls the flow of water to be softened; this bypass being directly connected with the backwash line to the tank so that on opening the valve a full flow of water is secured. Regulation of the flow, in order to secure, on the one hand, a current vigorous enough to carry away dirt and, on the other hand, not carrying away zeolites, is secured by an arrangement of a special device operated by the outflowing backwash water. In other words, I control the amount of backwash water by a special device installed beyond the zeolite apparatus and operated by the backwash water itself.

In the best embodiment of my invention at present known to me, this regulating device embodies a float which controls a valve installed in the wash water inlet or outlet pipe. In the case of open softeners, which are not closed at the top, it is necessary to have the controlled valve in the inlet pipe, but with closed containers it can more conveniently be located beyond the softener in the outlet pipe. The float is best located in, or in a chamber in connection with, a tank receiving the outflow. At a suitable height in this tank is arranged an overflow connection which may take the form of a simple weir on the side of the tank. Or a gated orifice of adjustable area may be provided in the bottom of the tank. Since the float controls the height of liquid above this orifice, outflow is made regular and can be set at any rate desired by varying the area of the orifice. Both expedients may be advantageously used together. The apparatus as described may be set once for all for any desired speed of water through the softening apparatus; and is automatic in its operation. No manual adjustment of valves in correlation to time-flow rate observations is necessary and error is obviated.

As so far described, the apparatus is adapted for an even and controlled although rapid flow of backwash water. It is, however, sometimes desirable to provide a more or less intermittent flow, and this can be secured by suitably modifying the apparatus. For example, there is no objection to a momentary violent flow; a rate of flow which, if continued, would lift zeolite granules to the outlet; and sometimes it is desirable in detaching sticky slime and mud to use such a momentary violent flow. This can be done by making the float tall and narrow, so that its rise to shut off the flow only occurs when the tank is filled to a certain height. In so doing, the control is, so to speak, spasmodic instead of uniform. A certain violent rush of water will take place until the tank is filled up and the float submerged to such a degree that it will close the valve controlling the flow of backwash water; the flow of backwash water will then be stopped while the outflow from the tank will continue. The tall and narrow float does not follow the water level in the tank immediately; an appreciable drop in the water level in the tank is necessary to cause the float to drop and to open the valve controlling the flow of wash water. When the valve opens, the wash water again rushes through the bed, but the violent flow ceases when the high water level in the tank has been reached again, and so on. Instead of using a tall and narrow float, it is convenient to use two floats at different levels connected by a threaded rod, as this permits adjustment.

In the accompanying illustration I have shown, more or less diagramatically, an apparatus within the present invention. In this showing Figure 1 is a view, partly in elevation and partly in vertical section, of an ordinary type of zeolite water softener with the parts comprising my improvements attached thereto; and Figure 2 is a detailed view of an alternative form of outflow controlling device adapted to produce a pulsatory flow of backwash water through the softener.

In the showing of Fig. 1, element 1 designates as a whole the water softener which is a casing of suitable material, such as steel, concrete, wood, etc. Hard water to be softened enters through pipe 2 passing meter 3. Valve 3' controls the flow to the meter. Beyond the meter is a valve A in pipe 4 to establish or cut off communication with vertical pipe 5 leading to a high point in the casing. This pipe 5 is alternately an inlet for water to be softened and an outlet for water used in backwashing. For the latter purpose, it is provided with a connection 6 valved at C leading to discharge pipe 7. Returning to the casing, this is provided with manhole 8 and bleed pipe 9, valved at N and M, for the outflow of used salt solution, leading by trap connection 12 to a sump 13. It is also provided with air relief pipe 14 valved at G and H. Pipe connection 17 communicates with the casing at $17^a$ and leads upward to a T-piece $19^a$, valved at B and D. The cross pipe 19 connected to B is provided with valved pipe 21 leading to 9, and leads past valve 22 to the water inlet (2). It will be noted that 19 is a bypass. Communication between the two inlets for raw water may be established by connection 23. The outlet for backwashing water is provided at 24 with a valve controlled by arm 25 and float 26 in constant level, flow regulating tank 27. Instead of using valve 24 on the outlet pipe, a valve $24^a$, similarly controlled, may be used on the inlet pipe 19. As shown, tank 27 is interiorly provided with a surge-preventing partition 28 of any suitable construction. It is provided with a regulable gated outlet 29, or with a weir 30 on its side, or with both. Both are shown. The whole apparatus is set to discharge waste liquids into sump 13 and sewer line 31. In order to ensure regularity of flow through the bottom gated outlet 29, it is best to provide a horizontal baffle $29^a$ located thereabove.

Returning to the softener, it may be noted that it is provided with a brine inlet 32 leading past valve E to T-piece $17^a$. The soft water outlet of the apparatus is shown at 33; this outlet connecting with T-piece $19^a$ and being valved at D. For the purpose of draining the entire structure when desired, drain 34 valved at F is provided.

The apparatus of Fig. 1 is adapted to produce a controlled even flow of backwash water through the apparatus, the float ensuring a constant height of liquid in tank 27 and therefore an even outflow, whether this outflow be through gated outlet 29 or weir 30.

In Fig. 2, I have shown a modified form of outflow device for the purpose of automatically controlling the flow of backwash water through the apparatus wherein, instead of an even flow, the flow is made pulsatory with the described advantage of being enabled to lift the zeolites by a momentary violent flow without danger of their reaching the outlet or going to waste through 5 and 7. In this showing, as in the showing of Fig. 1, outlet pipe 7 is valved at 24, the valve being controlled by rod 25 connected to a float. Within the tank are the same surge-preventing partitions 28 and 29$^a$. A regulable gated outlet 29 is provided at the bottom of the outflow tank, as in Fig. 1. The difference in structure is that of the float used. As shown, this float is composed of two sections 26$^a$ and 26$^b$ at different levels. These two sections are connected by a rod 40 threaded into both so that their distance apart can be readily regulated. The arrangement is equivalent to a tall narrow float of regulable height.

Describing first the operation of the apparatus of Fig. 1 as a whole, the water enters at 2, passes meter 3 and flows through 5 into the tank at a point near its top. During this time, valves G and H may be set "cracked" to permit egress of any air entering with the water. Soft water passes out at the bottom of the casing through T-piece 17$^a$, pipe 17 and T-piece 19$^a$, and thence to exit through 33, valve D being open. After a time, when the activity of the zeolites has diminished to a predetermined degree, it is necessary to regenerate with salt solution, rinse out, etc., and then the operation of softening water is resumed. Waters to be softened should be clear, but even clear waters carry more or less suspended matter; and, in the mode of operation just described, this suspended matter accumulates in and on the top layers of zeolites in the casing. Also, the relative arrangement of granules in the bed changes. After a certain accumulation has occurred, which may be after one softening operation or after several, according to the character of the water, it is necessary to remove this accumulation and also to disturb and rearrange the granules of the bed; or, in other words, to "backwash" the apparatus with a reversed rather violent flow of water in the opposite direction. As stated, this flow must be sufficiently fast to lift and remove dirt but not violent enough to remove the zeolites. With any particular water and any particular routine of operation this requires a rather nicely regulated control of the flow of backwash water.

In the invention of Fig. 1, this regulation is secured by closing valve 3' and thereby shutting off the flow of water to the top of the casing. Valve 22 is then opened wide. This allows the water from source 2 to enter freely. The entering water goes through 19, 19$^a$, 17 and 17$^a$, into the bottom of the casing, thence upward and therethrough, then downward by 5 and 7 into the tank 27. This tank fills up to a certain level established by the outflow through weir 30, or gated outlet 29, or both. Any tendency to rise above, or sink below, this predetermined level is obviated by float 26 controlling valve 24. With the aid of the float, the head of water above 29 is kept constant, and, therefore, the outflow past 29. The result is an absolutely regulated predetermined flow of water upward through the zeolites in the tank; the regulation however being that of outflow rather than inflow. It will be noted that this renders a timed meter control of the backwash water unnecessary; and obviates much opportunity for error. In using a meter to control a flow, of course the meter in turn must be controlled by observation of time; two correlated observations must be made. With the stated controlling of outflow no observation or attention is required. The outlet 29 of 27 may be regulated once for all and no further attention is required.

In backwashing in this manner, it is commonly desirable to open valve 21 somewhat to allow a slow flow of water through 9, in order to prevent granules of zeolite going into this pipe and being subsequently lost.

Connection 23 may be used when it is desired to adjust the flow regulating device with the aid of meter 3. All backwash flow may be through the meter and this connection; but it is better to have the by-pass 19 around the meter since the backwash flow is commonly much faster than the flow of hard water to be softened to which the meter is adjusted.

In using the structure of Fig. 2, the gated outlet 29 is so set as to have an outflow orifice of such an area as to deliver somewhat less water than will flow in through pipe 7. Under these conditions with the float in a low position, valve 24 is opened wide and a violent flow of water into the outflow tank occurs. The discharge through 29, being less than the delivery through 7, water accumulates in the tank until its level rises sufficiently high to raise the double float and close valve 24. Then the water in tank 29 runs out and the cycle is repeated. Conditions are so adjusted that the period of violent outflow through 7 shall not be long enough to enable zeolite granules to reach the inlet of 5 prior to the closure of valve 24 by the rise of the double float. Operating in this manner, backwash flow is controlled as before, but instead of being an even, moderately violent flow, it is pulsatory, being made violent momentarily at intervals.

It is possible to have a float controlled by the level in the backwash outflow tank govern a valve 24$^a$ in the backwash inlet but it is simpler, as shown to have it govern a valve in the outflow line.

What I claim is:—

1. In water softening apparatus, a casing containing zeolites, connections for delivering hard water thereto and removing softened water therefrom, connections for regenerating with salt solutions, connections for delivering backwash water to the casing, a connection for removing backwash water therefrom provided with float operated means for controlling the rate of flow of backwash water through the bed.

2. In water softening apparatus, a casing containing zeolites and provided with the usual connections for hard water, soft water, and regenerating solution, said casing being also provided with an inlet for backwash water and a pipe connection discharging such backwash water, a tank receiving said backwash water, and having an outlet of adjustable area, a valve in the backwash pipe and a float controlled by the level in said tank and controlling said valve.

3. In water softening apparatus, a casing containing zeolites and provided with the usual connections for hard water, soft water, and regenerating solution, said casing also being provided with an inlet for backwash water, a pipe connection discharging such backwash water, and a valve in the backwash water line, a constant level tank receiving the discharged backwash water and a float in the tank governing the valve in the backwash water line.

4. In water softening apparatus, a casing containing zeolites and provided with the usual connections for hard water, soft water, and regenerating solution, said casing being also provided with an inlet for backwash water and a pipe connection discharging such backwash water, a tank having a gated outlet orifice of adjustable area on its bottom and receiving the discharged backwash water and a float controlled by the level in the tank governing the valve in the backwash water line.

5. A water softener consisting of a casing, zeolites arranged therein, means for passing hard water to be softened through the bed of zeolites and removing the softened water, means for regenerating said bed of zeolites by passing a salt solution therethrough, means for rinsing out the adhering and absorbed salt solution after regeneration and means for washing and lifting up the granules of the bed of zeolites in order to rearrange said bed and to carry away any suspended matter which may have been retained by said bed during the softened period, characterized by the arrangement of an automatically working device which after it is once set will not permit the wash water to pass through the softener at a higher rate than that for which it is set.

6. In water softening apparatus, a casing containing zeolites, connections for delivering the hard water thereto and removing soft water therefrom, connections for regenerating with salt solution, connections for delivering backwash water to the casing, connections for removing backwash water therefrom and a receptacle for receiving the backwash water, said receptacle having an outlet arranged to deliver water from the receptacle at a rate slightly less than that at which the water is delivered thereto, and means in the receptacle for shutting off the water delivered thereto at intervals and comprising float mechanism adapted to control the flow of water to said receptacle.

In testimony whereof, I affix my signature.

SAMUEL B. APPLEBAUM.